United States Patent
Reynolds

(10) Patent No.: US 6,649,869 B2
(45) Date of Patent: *Nov. 18, 2003

(54) METHOD AND SYSTEM FOR WELDING WITH PARALLELED POWER SUPPLIES

(75) Inventor: Jon O. Reynolds, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/225,648

(22) Filed: Aug. 21, 2002

(65) Prior Publication Data

US 2002/0190046 A1 Dec. 19, 2002

Related U.S. Application Data

(63) Continuation of application No. 09/641,456, filed on Aug. 18, 2000, now Pat. No. 6,472,633.

(51) Int. Cl.[7] ................................................. B23K 9/10
(52) U.S. Cl. ................................................. 219/130.32
(58) Field of Search ....................... 219/137 PS, 130.1, 219/130.21, 130.31, 130.33, 124.03

(56) References Cited

U.S. PATENT DOCUMENTS

| | | |
|---|---|---|
| 3,356,928 A | 12/1967 | Parrish |
| 3,668,360 A | 6/1972 | Ballis |
| 3,694,621 A | 9/1972 | Wofsey |
| 4,442,339 A | 4/1984 | Mizuno et al. |
| 5,250,786 A | 10/1993 | Kikuchi et al. |
| 6,310,320 B1 | 10/2001 | Krauss et al. |
| 6,472,633 B1 * | 10/2002 | Reynolds ............... 219/130.32 |

FOREIGN PATENT DOCUMENTS

| | | |
|---|---|---|
| DE | 26 28 385 | 6/1978 |
| EP | 1 086 774 A2 | 3/2001 |
| EP | 1 086 774 A3 | 9/2002 |
| JP | 04224079 | 8/1992 |

OTHER PUBLICATIONS

Miller Electric Manufacturing Co.; Balancing/Paralleling Control Owner's Manual, Feb. 1997.

* cited by examiner

Primary Examiner—Clifford C. Shaw
(74) Attorney, Agent, or Firm—Ziolkowski Patent Solutions Group, LLC

(57) ABSTRACT

A method and system for welding with a plurality of welding power supplies connected in parallel. The system includes a first power supply and a second power supply. A reference signal indicative of a welding output of the first power supply is provided to a balancing circuit. The balancing circuit converts the reference signal into a command signal usable by the second power supply. A welding output of the second power supply is responsive to the command signal.

17 Claims, 4 Drawing Sheets

METHOD AND SYSTEM FOR WELDING WITH PARALLELED POWER SUPPLIES

The present invention is a continuation and claims the priority of allowed U.S. patent application Ser. No. 09/641,456, filed on Aug. 18, 2000, now U.S. Pat. No. 6,472,633 and entitled "Method and System For Welding With Paralleled Power Supplies."

BACKGROUND OF THE INVENTION

Different welding applications typically require different amounts of welding current. Most welding applications can be performed satisfactorily with welding currents of 1000 amps or less. Some welding applications, however, require welding currents in excess of 1000 amps. Certain submerged arc welding and electric slag welding applications, for example, require welding currents as high as 2000 to 3000 amps.

Welding power supply manufacturers generally manufacture power supplies having different welding current output capacities for use in connection with the various welding applications. These manufacturers provide many different off-the-shelf welding power supplies to handle welding applications requiring 1000 amps or less. This is because the vast majority of welding applications require current falling within this range and there is a demand for machines of this size.

On the other hand, the number of welding applications that require currents in excess of 1000 amps is much smaller. The availability of off-the-shelf power supplies for these applications is much more limited. Manufacturers are less willing to manufacture machines for which overall demand is low. An alternative to the limited selection of off-the-shelf power supplies capable of supplying in excess of 1000 amps is therefore desirable.

Finding an off-the-shelf power supply capable of welding at very high currents (e.g. 2000 amps and above) is even more difficult, if not impossible. Often times, the only solution is to have a machine custom built for the particular application at hand. This of course can be very expensive. It is also desirable, therefore, to have an alternative solution for welding applications requiring currents of 2000 amps and above.

As previously mentioned, different welding jobs require different amounts of welding current. A single company may be involved with a large number of these different welding applications. If the company generally only performs welding applications requiring low welding currents, it may only own lower current capacity machines.

Occasionally, the company may have the need to perform a welding application requiring a welding current that exceeds the capacity of its existing machines. The cost of purchasing a new power supply to handle the current demands of the higher current application may not be warranted. In this situation, it is desirable to leverage the lower current capacity machines owned by the company to provide the current for the higher current application.

One way that this is done is to connect the outputs of the lower current capacity machines in parallel with each other. Each of the connected machines provides a portion of the needed current for the application. This is one way to get higher current from several lower current capacity machines.

Prior art welding systems of this type use paralleled machines all operating in the same mode, either in the constant voltage mode or the constant current mode. Constant current (CC) mode, as used herein, means that the welding current output of the power supply is regulated or controlled to be substantially equal to a set value. Constant voltage (CV) mode, as used herein, means that the welding voltage output of the power supply is regulated or controlled to be substantially equal to a set value.

The output voltage of each constant current machine in a constant current system is typically unregulated and floats. This allows the welding load voltage to vary without adversely affecting the performance of the individual paralleled power supplies.

The output voltage of each individual constant voltage machine in a constant voltage system, however, is regulated. This can cause problems because the output voltages of the paralleled machines are connected in parallel across the welding load. Each machine, therefore, attempts to regulate the load voltage and maintain it at its own set level. If the set levels for each machine are different, even slightly different, the machines will fight with each other to regulate the load voltage. During this struggle, one machine typically ends up providing most or all of the load current and the other machine effectively shuts down.

One such prior art constant voltage welding system uses a remote command signal. The command signal is an adjustable zero to 10 volt DC signal. This prior art command signal is independent of, and not related to, the welding output of any of the paralleled power supplies. The same command signal is supplied to each of the power supplies. The output voltage of each machine is responsive to the command signal and in theory, each machine regulates its welding voltage to the same set value.

The problem with this prior art method is that each machine has its own internal component tolerances and gain function. The set voltage for each machine differs slightly as a result. One machine may be set to a welding voltage output of 30 volts by the command signal and another power supply may be set to 29.5 volts by the same command signal. The power supply set to 29.5 volts will attempt to reduce the welding load voltage while the power supply set to 30 volts will attempt to increase it. This inevitably results in the first machine shutting down and the second machine taking the entire load.

A constant voltage welding system using paralleled machines wherein the machines do not struggle with each other to regulate the load voltage is therefore desirable.

SUMMARY OF THE PRESENT INVENTION

According to a first aspect of the invention, an apparatus for paralleling a plurality of welding power supply outputs includes an input stage, an output stage and a balancing circuit. The input stage is configured to receive a reference signal indicative of a welding output of a first power supply. The output stage is configured to deliver a command signal usable by a second power supply having a welding output responsive to the command signal. The balancing circuit is connected to receive the reference signal from the input stage and to provide the command signal to the output stage as a function of the reference signal.

The reference signal is indicative of the welding current of the first power supply in one alternative and the welding output of the second power supply is a welding current responsive to the command signal in another alternative.

In one alternative, the apparatus is configured to provide a contactor control signal to the second power supply in response to the first welding power supply switching on. The apparatus is configured to provide a contactor control signal to the second power supply in response to the flow of welding current from the first power supply in another alternative embodiment.

According to a second aspect of the invention, an apparatus for paralleling the outputs of a plurality of welding power supplies includes a balancing circuit configured to electrically communicate with a first power supply and a second power supply. The balancing circuit receives a reference signal indicative of a welding output of the first power supply and delivers a command signal usable by the second power supply having a welding output responsive to the command signal. The command signal is a function of the reference signal.

The welding output of the first power supply is a welding current and the reference signal is indicative of the welding current of the first power-supply in one alternative. The welding output of the second power supply is a welding current responsive to the command signal in yet another alternative.

According to a third aspect of the invention, an apparatus for paralleling the outputs of a plurality of welding power supplies includes a balancing circuit configured to provide a command signal. The command signal is usable by a second power supply having a welding output responsive to the command signal. The command signal is a function of the welding output of a first power supply.

The welding output of the first power supply is a welding current and the command signal is a function of the welding current in one alternative and the welding output of the second power supply is a welding current responsive to the command signal in another alternative.

According to a fourth aspect of the invention, a method of paralleling the outputs of a plurality of welding power supplies includes receiving a reference signal and providing a command signal. The reference signal is indicative of a welding output of a first power supply. The command signal is usable by a second power supply having a welding output responsive to the command signal. The command signal is a function of the reference signal.

The welding output of the first power supply is a welding current and the reference signal is indicative of the welding current in one alternative embodiment. The welding output of the second power supply is a welding current responsive to the command signal in another alternative.

According to a fifth aspect of the invention, a method of paralleling the outputs of a plurality of welding power supplies includes providing a command signal. The command signal is a function of the welding output of a first power supply and is usable by a second power supply. The second power supply has a welding output responsive to the command signal.

According to a sixth aspect of the invention, a welding system includes a first power supply, a second power supply and a balancing circuit. The first power supply has a first welding output. The second power supply has a second welding output connected in parallel with the first welding output. The second welding output is responsive to a command signal. The balancing circuit is in electrical communication with the first power supply and the second power supply and receives a reference signal indicative of the first welding output. The balancing circuit provides the command signal to the second power supply as a function of the reference signal.

The first welding output is a first welding current and the reference signal is indicative of the first welding current in one alternative. The second welding output is a second welding current responsive to the command signal in a second alternative.

The welding system is configured to provide a contactor control signal to the second power supply in response to the flow of welding current from the first power supply in one alternative. In another alternative, the welding system is configured to provide a contactor control signal to the second power supply in response to the first power supply switching on.

The first power supply is operated in a constant voltage mode and the second power supply is operated in a constant current mode in one alternative. In an alternative embodiment, the first power supply and the second power supply have different maximum rated welding current capacities. The first power supply and the second power supply are in thermal balance with each other during normal operation in yet another alternative embodiment.

According to a seventh aspect of the invention, a welding system includes a first power supply and a second power supply. The first power supply has a first welding output. The second power supply has a second welding output connected in parallel with the first welding output. The second welding output is a function of the first welding output.

The first and second welding outputs are welding currents in one alternative. The first power supply operates in a constant voltage mode and the second power supply operates in a constant current mode in another alternative.

According to an eighth aspect of the invention, a welding system for delivering a welding current to a load includes a first power supply and a second power supply. The first and second power supplies have welding outputs connected in parallel across the load. The first power supply operates in a constant voltage mode The second power supply operates in a constant current mode. Both power supplies deliver a portion of the welding current to the load.

Figure 1:
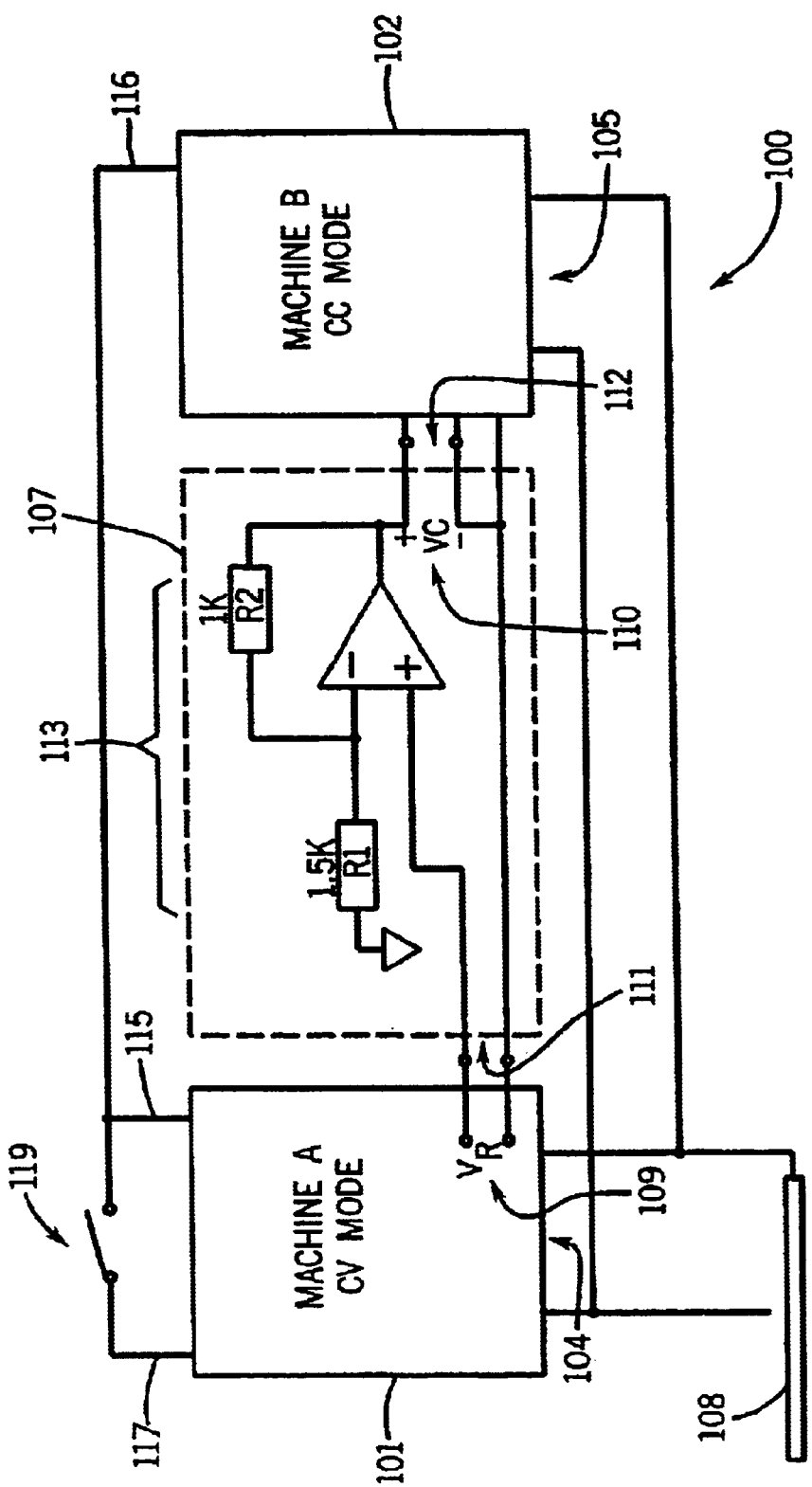
FIG. 1 shows a block diagram of a welding system using two inverter type power supplies connected in parallel in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to particular welding systems, components and power supplies, the invention is not limited to these particular systems, components or power supplies and other welding systems, components and power supplies can be used. Similarly, while the present invention will be illustrated with reference to a welding environment, it should be understood at the outset that the invention can also be used in other environments, including plasma cutting or other high power applications.

Generally, the present invention involves a system and method of welding using a plurality of power supplies. The power supplies are connected in parallel with each other across a welding load. Each of the paralleled power supplies provides a portion of the overall welding current to the welding load. The welding system operates as a constant voltage welding system in the preferred embodiment. In an alternative embodiment, the welding system operates as a constant current welding system.

One of the paralleled power supplies acts as a "master" machine. The other paralleled power supplies act as "slave" machines. A welding output (e.g. welding current or welding voltage) of each slave machine is a function of a welding output of the master machine in the present invention. Master machine or master power supply, as used herein, means a welding power supply that provides a signal indicative of its welding output to other welding power supplies connected in parallel with the master machine. Slave machine or slave power supply, as used herein, means a welding power supply which responds to a remote command signal that is a function of the output of another power supply connected in parallel with the slave machine.

The master machine provides a reference signal indicative of a welding output of the master machine. Reference signal, as used herein, means any signal that is indicative of, or a function of, a welding output of a power supply regardless of whether or not the signal is used to provide feedback to the power supply and regardless of whether or not the signal is provided by the power supply. The reference signal is indicative of the welding current provided by the master machine in the preferred embodiment. In an alternative embodiment, the reference signal is indicative of the welding voltage of the master machine.

A remote command signal controls the welding output level of each of the slave machines. Remote command signal or command signal, as used herein, means any signal to which a welding output of a power supply is responsive. A remote command signal can be provided either external or internal to the power supply. The command signal controls the level of the welding output current provided by each slave machine in the preferred embodiment. In an alternative embodiment, the command signal controls the level of the welding voltage output of the slave machines.

The preferred embodiment of the present invention is a constant voltage current following welding system. This means that the load voltage is regulated and the welding output current of the slave machines is a function of (e.g. follows) the welding current of the master machine.

The master machine is operated in a constant voltage mode in this embodiment. Its role is to regulate the load voltage and provide current to the load. The reference signal from the master machine is indicative of the master machine's welding output current. The reference signal is provided to a balancing device for processing. The balancing device receives the reference signal from the master machine and converts it into a command signal usable by the slave machines. The command signal is a function of the reference signal in the preferred embodiment.

The slave machines are operated in a constant current mode in the preferred embodiment. The welding current output of each slave machine is responsive to the command signal (e.g. each slave machine follows the welding current output of the master machine). The welding output voltages of each slave machine floats with the regulated load voltage. This is because the welding output voltage of each slave machine is unregulated in the constant current mode. The role of slave machines is to provide current to the welding load in this embodiment.

Both the master machine and the slave machines are operated in a constant current mode in an alternative embodiment. This embodiment is a constant current current follower. In a constant current, current following system, the current from each power supply is regulated (and thus so is the load current) and the welding current of the slave machines follows the welding current of the master machine. The reference signal from the master machine is indicative of its welding current. The welding output current from each slave machine is responsive to the command signal.

In another alternative embodiment, both the master machine and the slave machines are operated in a constant voltage mode. This embodiment is a constant voltage voltage follower. In a constant voltage voltage following system, the load voltage is regulated and the welding voltage of the slave machines follows the welding voltage of the master machine. The reference signal from the master machine is indicative of welding voltage output from the master machine and the welding voltage of the slave machines is responsive to the command signal.

FIG. 1 shows a first embodiment of the present invention. A welding system 100 includes a first power supply 101 having a welding output 104, a second power supply 102 having a welding output 105, and a balancing device 107 electrically connected between power supplies 101 and 102. Welding outputs 104 and 105 are connected in parallel across a welding load 108.

Welding system 100 operates as a constant voltage, current following welding system in this embodiment. Power supply 101 operates in a constant voltage mode and is the master machine. Power supply 101 provides a reference signal 109 ($V_R$) to balancing device 107. Reference signal 109 is indicative of the welding current output of power supply 101. In an alternative embodiment, reference signal 109 is indicative of the welding output voltage of power supply 101.

The value of reference signal 109 equals one volt for every 100 amps of welding current output from power supply 101. Power supply 101 has a maximum rated welding current capacity of approximately 565 amps at a 60% duty cycle (or 450 amps at a 100% duty cycle) in this embodiment. Reference signal 109, therefore, covers a range of values from approximately zero to 5.65 volts.

Power supply 102 operates in a constant current mode and is a slave machine. Power supply 102 is configured to receive an external command signal 110 (vc) from balancing device 107. Command signal 110 controls the level of the welding current output from power supply 102 in this embodiment. In an alternative embodiment, command signal 110 controls the welding output voltage of power supply 102.

The welding output current of power supply 102 is responsive to a command signal having a value between zero and 10 volts in this embodiment. As the value of the command signal increases from zero to 10 volts, the welding current output of power supply 102 increases from its minimum current output (approximately 20–50 amps) to its maximum rated current output of 565 amps at a 60% duty cycle (or 450 amps at a 100% duty cycle).

Generally, thermal balance between the master power supply and the slave power supplies is desirable. This helps insure that the operating stresses on each machine will be similar. Power supplies are thermally balanced when they are each providing substantially the same amount of welding load current relative to their maximum rated welding current capacity. Maximum rated welding current capacity, as used herein, means the welding output current assigned by the manufacturer for a specified operating condition such as a specified duty cycle (for example, see the International Electrotechnical Commission standard 60974-1, second ed. 1998–99; Article 3.21 entitled Arc Welding Equipment-Part 1: Welding Power Sources).

One way to achieve thermal balance is to make the reference signal (which is indicative of the welding current from power supply 101) and the command signal (which controls the welding current of power supply 102) cover the same range of values. Reference signal 109 ranges in value from 0 to 5.65 volts. This is less than the full range of values for command signal 110. It is desirable therefore to scale reference signal 109 upwards in this embodiment. This scaling is provided by balancing device 107. In an alternative embodiment, the range of values for the reference signal and the command signal are the same or substantially the same.

Balancing device 107 includes an input port (also referred to as an input stage) 111, an output port (also referred to as an output stage) 112 and a balancing circuit 113. In this embodiment, input stage 111 and output stage 112 are merely connectors and cables configured to communicate with power supplies 101 and 102. In alternative embodiments, however, these stages also include circuitry such as buffer amplifiers, pre-processing circuitry and post processing circuitry.

Input port 111 is configured to receive reference signal 109 from power supply 101. Reference signal 109 is processed (scaled) by balancing circuit 113 into command signal 110 which is usable by power supply 102. Output port 112 is configured to provide command signal 110 to power supply 102.

Balancing circuit 113 in this embodiment is a non-inverting amplifier comprising an op-amp A1, a first resistor Ri and a feedback resistor R2. Resistor R1 has a value of 1500 ohms in this embodiment and resistor R2 has a value of 1000 ohms. The overall operation of amplifier circuit 113 is well known by those skilled in the art and no detailed description of its operation is required here.

The gain of amplifier circuit 113 is equal to 1+R2/R1 which in this embodiment is approximately 1.667. A signal input to balancing device 107 ranging in value from 0 to 5.65 volts results in an output signal from balancing device 107 ranging in value from 0 to 9.4 volts (approximately the full range of values covered by command signal 110). The desired scaling is therefore achieved.

The overall operation of welding system 100 will now be described. Power supply 101 is turned on (e.g. a welding voltage is turned on at welding output 104) by applying a 24 volt AC contactor control signal to pin 115 in this embodiment. Contactor control signal, as used herein, means any signal, AC or DC, that is used to turn on the welding voltage of a power supply. Power supply 102 is similarly turned on by applying a 24 volt AC contactor control signal to pin 116. Pins 115, 116 are connected together in this embodiment. The contactor control signal is provided from pin 117 on master power supply 101. This control signal is applied to pins 115, 116 simultaneously by closing a switch 119. Switch 119 is typically the trigger switch of a welding torch or the on/off switch of a submerged arc welding system.

In an alternative embodiment, the contactor control signal from pin 117 of power supply 101 is provided to power supply 102 through balancing device 107. The contactor control signal is provided to power supply 102 by balancing circuit 107 in another alternative embodiment.

An open circuit welding voltage from each power supply is applied across welding load 108 once the power supplies are turned on. Power supplies 101, 102 are inverter type power supplies in this embodiment, such as the Invision™ 456P manufactured by Miller Electric Mfg. Co., Appleton, Wis. The open circuit voltage for this type of power supply is approximately the same regardless of whether the supply is operating in a constant voltage mode or a constant current mode. Therefore, starting is not adversely affected from having the outputs connected in parallel and each power supply can be turned on at approximately the same time.

As soon as an arc is established, weld current begins to flow to weld load 108 from power supply 101. Reference signal 109, which is indicative of the welding current from power supply 101, is provided to balancing device 107 and is converted into command signal 110. Command signal 110 is then provided to power supply 102.

The welding current output of power supply 102 quickly responds to command signal 110 and power supply 102 begins providing additional current to welding load 108. The welding current from power supply 101 decreases as a result. Within a short period of time, the system reaches equilibrium with each machine providing approximately the same amount of welding current to the load relative to its maximum rated welding current capacity.

Welding system 100 is a constant current current following system in an alternative embodiment of the present invention. Master machine 101 operates in a constant current mode and includes a feedback signal that is used to regulate the welding current. The feedback signal is also used as the reference signal 109 in this embodiment.

Many off-the-shelf power supplies have a feedback signal for use in regulating a welding output (welding current or welding voltage) of the power supply. Feedback signal, as used herein, means a signal that is used to regulate a welding output of a power supply. These feedback signals are often provided as a separate output to be used for monitoring a welding output. When available, these feedback signals can also be used as the reference signal.

Figure 2:
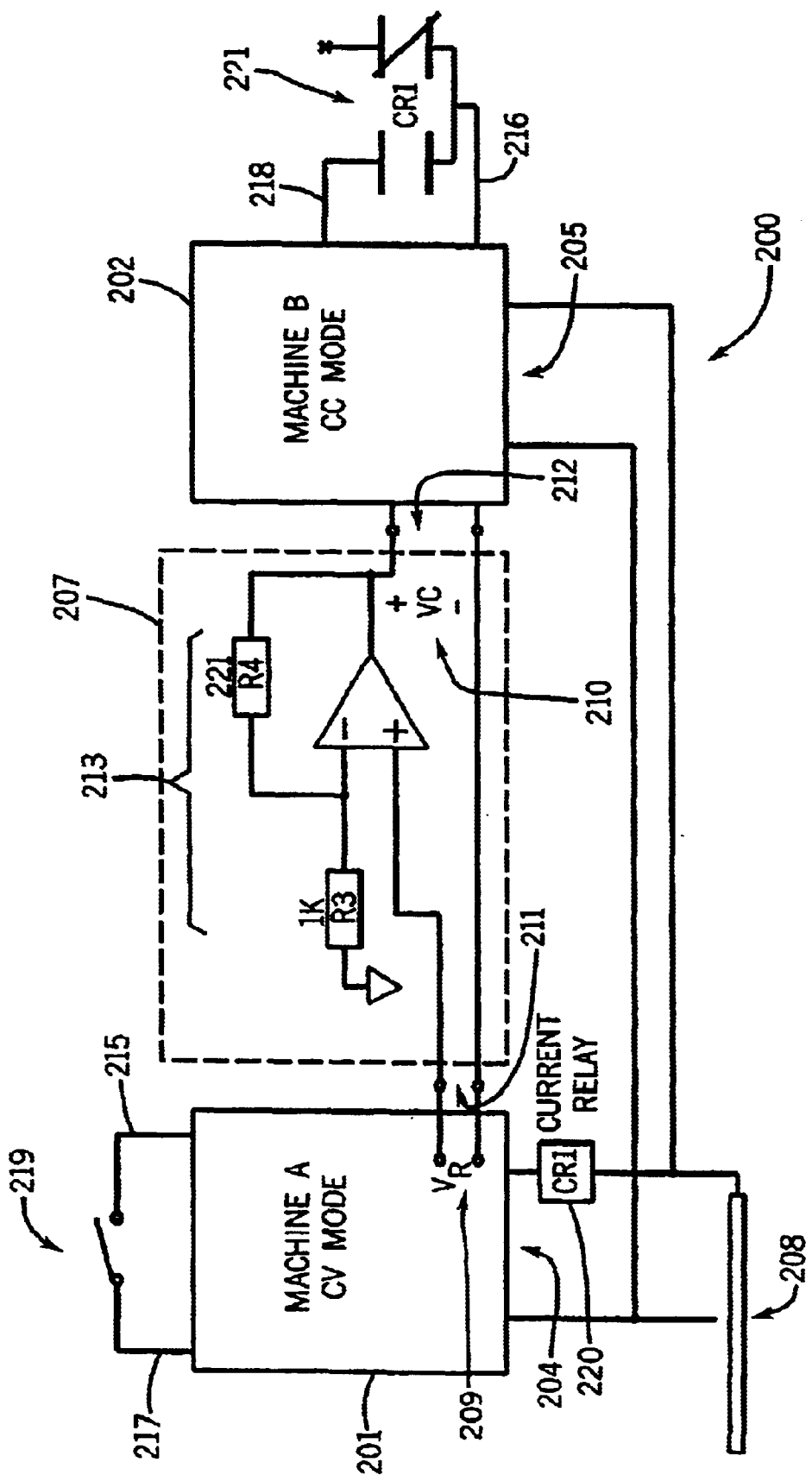
FIG. 2 shows a block diagram of a welding system using two phase control type power supplies connected in parallel in accordance with the present invention.

FIG. 2 shows a second embodiment of the present invention. A welding system 200 includes a first power supply 201 having a welding output 204, a second power supply 202 having a welding output 205, and a balancing device 207 electrically connected between power supplies 201 and 202. Welding outputs 204 and 205 are connected in parallel across a welding load 208.

Welding system 200 is similar to welding system 100 of FIG. 1 and therefore will not be described in great detail. The key differences between welding system 200 and welding system 100 relate to the type and size of power supplies used. Power supplies 201 and 202 are phase control type power supplies as compared to the inverter type power supplies used in the embodiment of FIG. 1. One such power supply is the Dimension™ 652 also manufactured by Miller Electric Mfg. Co. The power supplies in this embodiment have a maximum rated current capacity of approximately 812 amps at a 60% duty cycle (or 650 amps at a 100% duty cycle).

The welding current from power supply 202 is responsive to a command signal that ranges from 0 to 10 volts. Reference signal 209 has a value equal to 1 volt for every 100 amps of welding output current from power supply 201, or, in other words, a value from zero to 8.1 volts. To insure thermal balance between power supplies, the reference signal range must be scaled upward in this embodiment also.

Balancing device 207 includes a balancing circuit 213 having an op-amp A2, a first 1000 ohm resistor R3 and a 221 ohm feedback resistor R4. The gain of amplifier circuit 213 is 1.221 in this embodiment. When applied to reference signal 209 (having a range of values from zero to 8.10 volts), the resulting range of values for command signal 210 is zero to 9.9 volts.

The other difference between welding system 100 and welding system 200 relates to how each power supply is turned on. It is desirable to delay the start of the slave power supplies in this embodiment until after welding current begins flowing from the master power supply. This is because the open circuit voltage of these power supplies is different when they are operating in the constant voltage mode as compared to the constant current mode.

Power supply 201 is operating in the constant voltage mode in this embodiment and has an open circuit output voltage on the order of 30 volts. Power supply 202, on the other hand, is operating in a constant current mode and has an open circuit output voltage on the order of 80 volts. When both power supplies are started at the same time, power supply 201, which regulates the load voltage, sees the higher voltage of power supply 202. Power supply 201 will immediately try to lower that voltage. This results in power supply 201 effectively shutting down which interferes with the starting of welding system 200.

To prevent this from occurring, it is desirable to delay the start of power supply 202 until after current begins to flow from power supply 201. A current sensing relay 220 is placed in series with the current output of power supply 201 to provide the desired delay. Relay 220 contains a pair of normally open contacts 221 which are placed between pins 216 and 218 of power supply 201.

The starting sequence for welding system 200 is as follows. Switch 219 (e.g trigger switch of a welding gun) is first closed which turns on the voltage to welding output 204 of master machine 201. Once the arc is established, current begins to flow from power supply 201. Relay 220 senses the current flow and closes contacts 221. Closing contacts 221 allows the 24 volt AC contactor control signal available at pin 218 to be applied to pin 216 and power supply 202 turns on. In an alternative embodiment, the 24 volt AC contactor control signal is provided to power supply 102 directly from balancing circuit 207. From this point, welding system 200 operates in a similar manner to welding system 100.

Although the delay is provided using a relay in this embodiment, the present invention is not limited to this type of delay device. Any device (analog or digital) that delays the start of the slave power supplies until after current begins to flow from the master power supply can be used. Likewise, although delay devices are shown in use with phase control type power supplies in this embodiment, they can also be used with the inverter type power supplies of welding system 100.

Figure 3:
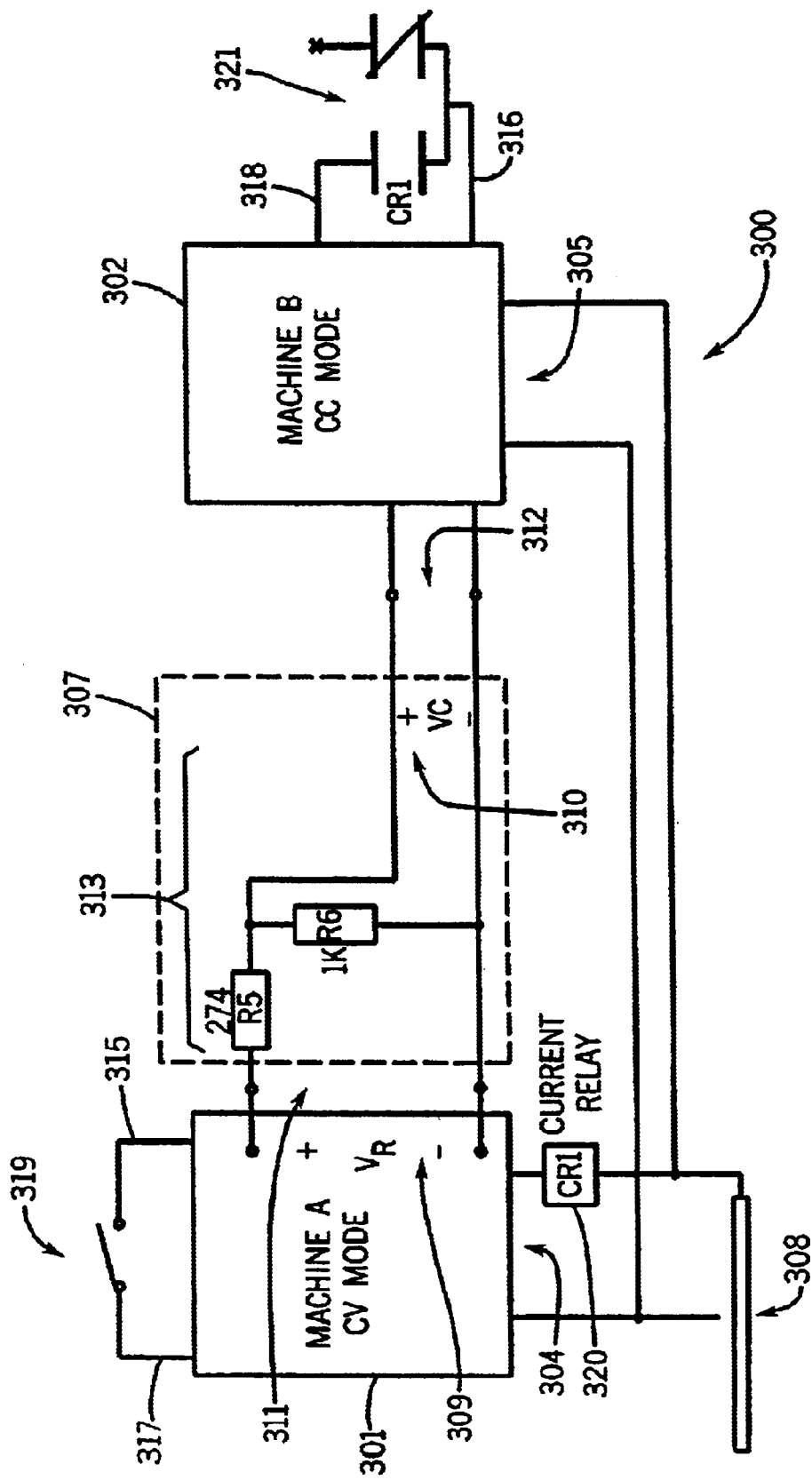
FIG. 3 shows a block diagram of a second welding system using two phase control type power supplies connected in parallel in accordance with the present invention.

FIG. 3 shows a third embodiment of the present invention. A welding system 300 includes a first power supply 301 having a welding output 304, a second power supply 302 having a welding output 305, and a balancing device 307 electrically connected between power supplies 301 and 302. Welding outputs 304 and 305 are connected in parallel across a welding load 308. Welding system 300 and welding system 200 operate similarly and therefore only the differences between the systems will be described in detail.

Slave power supply 302 produces a welding current that is responsive to a command signal ranging in value from 0 to 10 volts. Power supplies 301, 302 are phase control type power supplies having a maximum welding output current of 1250 amps at a 60% duty cycle (or 1000 amps at a 100% duty cycle) in this embodiment. The range of values for reference signal 302 is therefore zero to 12.5 volts (assuming 1 volt for every 100 amps of output current). The upper end of this range exceeds the 10 volt limit for command signal 311.

As previously mentioned, it is desirable to have both master power supply 301 and slave power supply 302 operate at the same current output levels relative to there maximum rated current capacities. To accomplish this, reference signal 309 must be scaled downward in this embodiment rather than upward. This downward scaling is provided by balancing device 307.

Balancing device 307 includes an attenuator circuit 313 comprising a 274 ohm input resistor R5 and a 1000 ohm second resistor R6. The operation of attenuator circuit 313 is well known by those skilled in the art and no detailed description of its operation is required. The attenuation of circuit 313 is equal to R4/(R3+R4) which in this embodiment is approximately 0.785. Thus, a signal input to attenuator circuit 313 ranging in value from 0 to 12.5 volts will result in a command signal 310 ranging in value from 0 to 9.81 volts (which is roughly equivalent to the range for the remote command input of power supply 302).

The previous embodiments of the present invention have all included only two paralleled power supplies. The present invention, however, includes systems having more than two power supplies. For example, other embodiments of the present invention contain three, four and five power supplies connected in parallel. The present invention is also not limited to paralleled power supplies having all the same maximum rated current capacities. In an alternative embodiment, power supplies having different maximum rated current capacities are connected in parallel.

Figure 4:
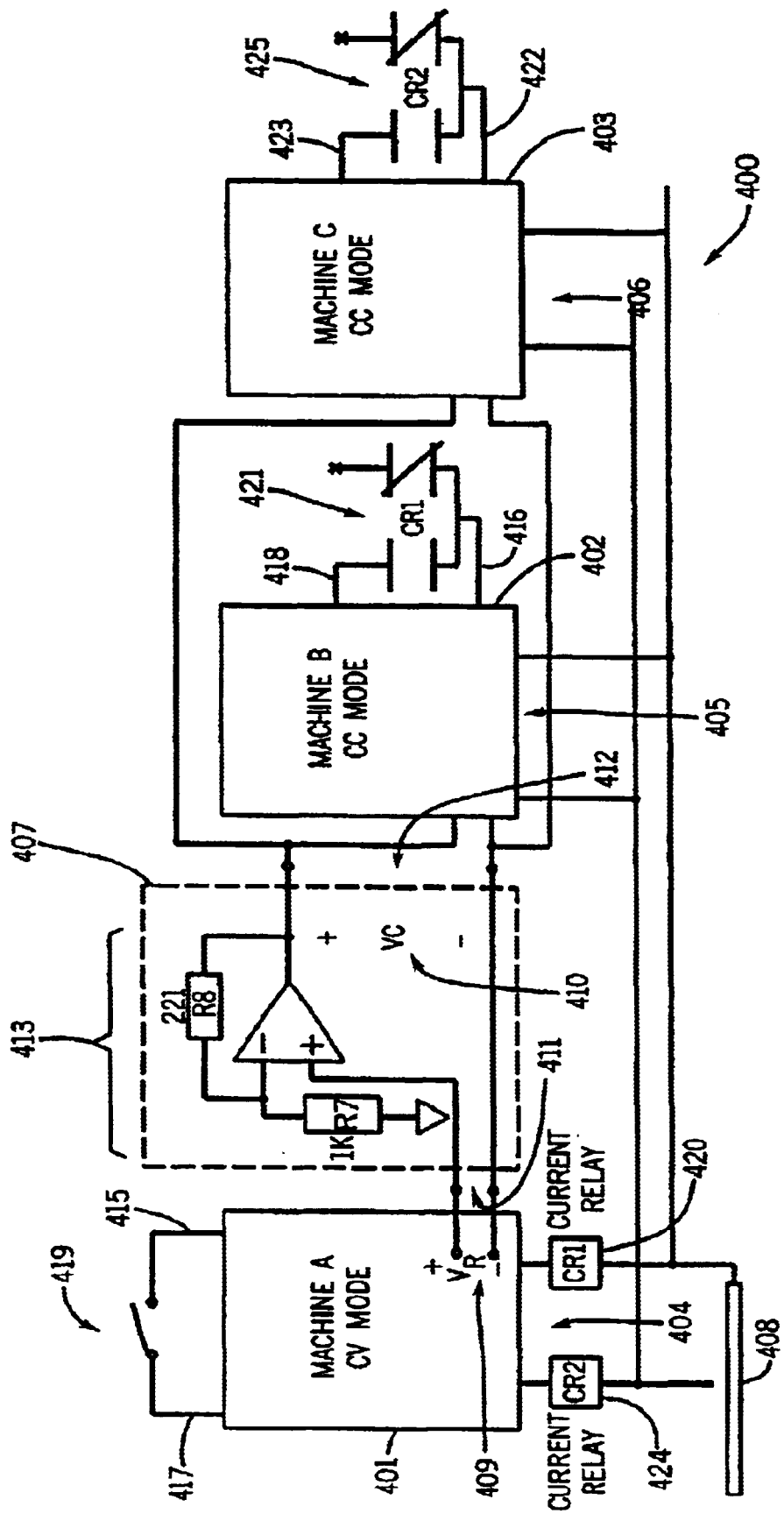
FIG. 4 shows a block diagram of a welding system using three phase control type power supplies connected in parallel in accordance with the present invention.

FIG. 4 shows a fourth embodiment of the present invention having more than two power supplies. Each of the power supplies in this embodiment has a different maximum rated current capacity. Welding system 400 includes a first power supply 401 having a welding output 404, a second power supply 402 having a welding output 405, a third power supply 403 having a welding output 406 and a balancing device 407 electrically connecting power supply 401 with power supplies 402, 403. Welding outputs 404, 405 and 406 are all connected in parallel across a welding load 408.

Power supply 401 operates in the constant voltage mode in this embodiment and acts as the master machine. In an alternative embodiment, master machine 401 operates in a constant current mode. The maximum rated output current of power supply 401 is 810 amps at a 60% duty cycle (or 650 amps at a 100% duty cycle). Power supplies 402, 403 operate in the constant current mode in this embodiment and are slave machines to power supply 401. The maximum rated output current of power supply 402 is 565 amps at a 60% duty cycle (or 450 amps at a 100% duty cycle) in this embodiment. The maximum rated output current of power supply 403 is 375 amps at a 60 k duty cycle (or 300 amps at a 100% duty cycle).

The overall operation of welding system 400 is similar to the operation of welding system 200. The main difference between the two welding systems is that welding system 400 has a plurality of power supplies operating as slave machines and the usable command signal provided from balancing device 407 is provided to both slave power supplies 402, 403 simultaneously. In this manner, all three power supplies contribute to the total load welding current and all three power supplies are operated at the same current output capacity relative to there maximum rated current capacities (e.g. they are all in thermally balance).

Welding system 400 uses two current sensing relays 420, 424 to delay the start of slave machines 402, 403. Relays 420, 424 sense the welding current flowing from power supply 401. In an alternative embodiment, a single relay is used to delay the start of slave power supplies 402, 403.

Welding system 400 is also shown using one balancing circuit to communicate with two slave machines. In alternative embodiments, a plurality of balancing devices are used, each one communicating with one or more slave machines.

The previous embodiments of the present invention included a balancing device having an amplifier and an attenuator as the balancing circuit. The present invention is not limited to these types of balancing circuits or devices and other types of balancing circuits and balancing devices can be used. Likewise, the present invention is not limited to amplification, attenuation or scaling and other types of processing can be used. Balancing device or circuit, as used herein, means any device or circuit, both analog and digital, that converts, processes or scales a reference signal into a command signal usable by other power supplies. Similarly, the previous embodiments of the present invention have all used a balancing device that is external to the power supplies. In alternative embodiments, the balancing device is internal to the power supplies and is in the master power supply in one embodiment and is in the slave machines in alternative embodiments.

Numerous modifications may be made to the present invention which still fall within the intended scope hereof. Thus, it should be apparent that there has been provided in accordance with the present invention a method and apparatus for welding with a plurality of power supplies connected in parallel that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An apparatus for paralleling a plurality of welding power supply outputs comprising:
   an input stage configured to receive a reference signal indicative of actual welding output of a first power supply;
   an output stage configured to deliver a command signal usable by a second power supply having a welding output responsive to the command signal;
   a balancing circuit connected to receive the reference signal from the input stage and to provide the command signal to the output stage wherein the command signal is a function of the reference signal; and
   wherein the apparatus is configured to provide a contactor control signal to the second power supply in response to the first power supply switching on.

2. The apparatus of claim 1 wherein the welding output of the first power supply is a welding current and the reference signal is indicative of the welding current of the first power supply.

3. The apparatus of claim 2 wherein the welding output of the second power supply is a welding current responsive to the command signal.

4. An apparatus for paralleling a plurality of welding power supply outputs comprising:
   an input stage configured to receive a reference signal indicative of actual welding output of a first power supply;
   an output stage configured to deliver a command signal usable by a second power supply having a welding output responsive to the command signal;
   a balancing circuit connected to receive the reference signal from the input stage and to provide the command signal to the output stage wherein the command signal is a function of the reference signal; and
   wherein the apparatus is configured to provide a contactor control signal to the second power supply in response to the flow of welding current from the first power supply.

5. A welding system comprising:
   a first power supply pp atlngina constant voltage mode having a first welding output;
   a second power supply operating in a constant current mode having a second welding output connected in parallel with the first welding output; and
   a balancing circuit in electrical communication with the first power supply and the second power supply wherein the balancing circuit receives a signal indicative of actual welding output of the first power supply and provides a command signal to the second power supply configured to regulate the second welding output to achieve an equilibrium between the first welding output and the second welding output.

6. The welding system of claim 5 wherein the first welding output is a first welding current and the reference signal is indicative of the first welding current.

7. The welding system of claim 6 wherein the second welding output is a second welding current responsive to the command signal.

8. The welding system of claim 6 wherein the balance circuit is configured to provide a contactor control signal to the second power supply in response to the flow of welding current from the first power supply.

9. The welding system of claim 5 wherein the balance circuit is further configured to provide a contactor control signal to the second power supply in response to the first power supply switching on.

10. The welding system of claim 5 wherein the first power supply has a first maximum rated welding current capacity and the second power supply has a second maximum rated welding current capacity difference from the first maximum rated welding current capacity.

11. The welding system of claim 5 wherein both the first power supply and the second power supply are in thermal balance with each other during normal operation.

12. A welding system for delivering a welding current to a load comprising:
- a first power supply having a welding output connected across the load and operating in a constant voltage mode wherein the first power supply delivers a portion of the welding current to the load;
- a second power supply having a welding output connected across the load in parallel with the welding output of the first power supply and operating in a constant current mode wherein the second power supply delivers a portion of the welding current to the load; and
- a control configured to:
  - detect a signal indicative of actual welding output of the first power supply; and
  - output a command signal to the second power supply configured to regulate the welding output of the second power supply such that each power supply supplies an equal portion of the welding current to the load.

13. The welding system of claim 12 wherein the command signal is configured to regulate the output of the second power supply such that each power supply provides an approximate equal amount of welding current to the load relative to each power supply's maximum rated welding current capacity.

14. The welding system of claim 12 wherein the control is further configured to provide a contactor control signal to the second power supply in response to the flow of welding current from the first power supply.

15. The welding system of claim 12 wherein the control is further configured to provide a contactor control signal to the second power supply in response to the first power supply switching on.

16. The welding system of claim 12 wherein the first power supply has a first maximum rated welding current capacity and the second power supply has a second maximum rated welding current capacity different from the first maximum rated welding current capacity.

17. The welding system of claim 12 wherein both the first power supply and the second power supply are in thermal balance with each other during normal operation.

* * * * *

UNITED STATES PATENT AND TRADEMARK OFFICE
CERTIFICATE OF CORRECTION

PATENT NO. : 6,649,869 B2
DATED : November 18, 2003
INVENTOR(S) : Jon O. Reynolds It is certified that error appears in the above-identified patent and that said Letters Patent is hereby corrected as shown below:

Column 6,
Line 58, delete "(vc)" and substitute therefore -- $(v_c)$ --;

Column 7,
Line 48, delete "Ri" and substitute therefore -- Rl --;

Column 11,
Line 2, delete "60 k" and substitute therefore -- 60% --;

Column 12,
Line 32, delete "pp atlngina" and substitute therefore -- operating in a --;

Signed and Sealed this

Ninth Day of March, 2004

JON W. DUDAS
*Acting Director of the United States Patent and Trademark Office*